United States Patent
Mazaira et al.

(10) Patent No.: US 11,890,914 B2
(45) Date of Patent: Feb. 6, 2024

(54) BALANCING BATTERY HEATING AND CABIN HEATING WITH SHARED THERMAL-MANAGEMENT SYSTEM

(71) Applicant: FORD GLOBAL TECHNOLOGIES, LLC, Dearborn, MI (US)

(72) Inventors: Jordan Mazaira, Taylor, MI (US); Angel Fernando Porras, Dearborn, MI (US); Brett Allen Dunn, Plymouth, MI (US); Zachary March, Highlands Ranch, CO (US); Alan Gutowski, Wixom, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 178 days.

(21) Appl. No.: 17/467,898

(22) Filed: Sep. 7, 2021

(65) Prior Publication Data
US 2023/0074313 A1 Mar. 9, 2023

(51) Int. Cl.
*B60H 1/00* (2006.01)
*B60L 50/60* (2019.01)
(Continued)

(52) U.S. Cl.
CPC ..... *B60H 1/00278* (2013.01); *B60H 1/00828* (2013.01); *B60H 1/00885* (2013.01);
(Continued)

(58) Field of Classification Search
CPC ............ B60H 1/00278; B60H 1/00828; B60H 1/00885; B60H 1/12; B60H 2001/00307; B60L 50/60; B60L 58/26; H01M 10/615; H01M 10/625; H01M 10/63; H01M 10/6563; H01M 10/663; H01M 2220/20
See application file for complete search history.

(56) References Cited

U.S. PATENT DOCUMENTS 9,114,794 B2  8/2015  King et al.
10,843,550 B2  11/2020  Wong
(Continued)

FOREIGN PATENT DOCUMENTS

DE  102016115626 A1  4/2018
JP  2015080284 A * 4/2015 ............. B60L 1/003

OTHER PUBLICATIONS

Morimoto et al., JP 2015-08284 A Espacenet machine translation, 2015 (Year: 2015).*

*Primary Examiner* — Adam A Arciero
(74) *Attorney, Agent, or Firm* — David B Kelley; Brooks Kushman P.C.

(57) ABSTRACT

A vehicle includes a traction battery, an electric machine powered by the traction battery and configured to power wheels of the vehicle, and a thermal-management system. The thermal-management system includes a battery loop, a cabin heating loop, and a valve configured to fluidly connect the battery loop and the cabin heating loop when in a first position and configured to fluidly isolate the battery loop and the cabin heating loop when in a second position. A controller is programmed to, responsive to (i) battery heating being requested, (ii) a temperature of the battery being greater than a lower threshold, and (iii) cabin heating being requested, actuate the valve to the first position to heat a cabin and the battery.

16 Claims, 3 Drawing Sheets

(51) Int. Cl.
  *B60L 58/26*     (2019.01)
  *B60H 1/12*      (2006.01)
  *H01M 10/6563*   (2014.01)
  *H01M 10/625*    (2014.01)
  *H01M 10/63*     (2014.01)
  *H01M 10/663*    (2014.01)
  *H01M 10/615*    (2014.01)
  *B60H 1/02*      (2006.01)

(52) U.S. Cl.
  CPC ............... *B60H 1/02* (2013.01); *B60L 50/60* (2019.02); *B60L 58/26* (2019.02); *H01M 10/615* (2015.04); *H01M 10/625* (2015.04); *H01M 10/63* (2015.04); *H01M 10/6563* (2015.04); *H01M 10/663* (2015.04); *B60H 2001/00307* (2013.01); *H01M 2220/20* (2013.01)

(56) References Cited

U.S. PATENT DOCUMENTS

| | | | |
|---|---|---|---|
| 2016/0347150 A1* | 12/2016 | Kakade | B60H 1/004 |
| 2019/0111761 A1* | 4/2019 | Jaglan | B60H 1/00735 |
| 2020/0062106 A1* | 2/2020 | Wong | B60L 58/27 |
| 2020/0076029 A1 | 3/2020 | Litz | |

* cited by examiner

BALANCING BATTERY HEATING AND CABIN HEATING WITH SHARED THERMAL-MANAGEMENT SYSTEM

TECHNICAL FIELD

The present disclosure relates to thermal-management systems for electric vehicles.

BACKGROUND

The need to reduce fuel consumption and emissions in automobiles and other vehicles is well known. Vehicles are being developed that reduce, or completely eliminate, reliance on internal-combustion engines. Electric and hybrid vehicles are one type of vehicle currently being developed for this purpose. Electric and hybrid vehicles include a traction motor that is powered by a traction battery. The traction battery may require a thermal-management system to thermally regulate the temperate of the battery cells.

SUMMARY

According to one embodiment, a vehicle includes a traction battery, an electric machine powered by the traction battery and configured to power wheels of the vehicle, and a thermal-management system. The thermal-management system including a battery loop configured to circulate coolant through the traction battery, a cabin heating loop configured to circulate coolant through a heater and a heater core, a blower configured to circulate air through the heater core to heat a passenger cabin of the vehicle, and a valve configured to fluidly connect the battery loop and the heating loop when the valve is in a first position and configured to fluidly isolate the battery loop and the heating loop when the valve is in a second position. A controller is programmed to, responsive to (i) battery heating being requested, (ii) a temperature of the battery being between upper and lower thresholds, and (iii) cabin heating being requested, actuate the valve to the second position and energize the blower and the heater to provide heating to the passenger cabin but not the battery.

According to another embodiment, a vehicle includes a traction battery, an electric machine powered by the traction battery and configured to power wheels of the vehicle, and a thermal-management system. The thermal-management system includes a battery loop, a cabin heating loop, and a valve configured to fluidly connect the battery loop and the cabin heating loop when in a first position and configured to fluidly isolate the battery loop and the cabin heating loop when in a second position. A controller is programmed to, responsive to (i) battery heating being requested, (ii) a temperature of the battery being greater than a lower threshold, and (iii) cabin heating being requested, actuate the valve to the first position to heat a cabin and the battery.

According to yet another embodiment, a method of sharing heat between a passenger cabin and a traction battery including actuating a valve to sever fluid communication between a heater core and the traction battery to heat the passenger cabin but not the traction battery in response to (i) battery heating being requested, (ii) a temperature of the traction battery greater than a threshold, and (iii) cabin heating being requested.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
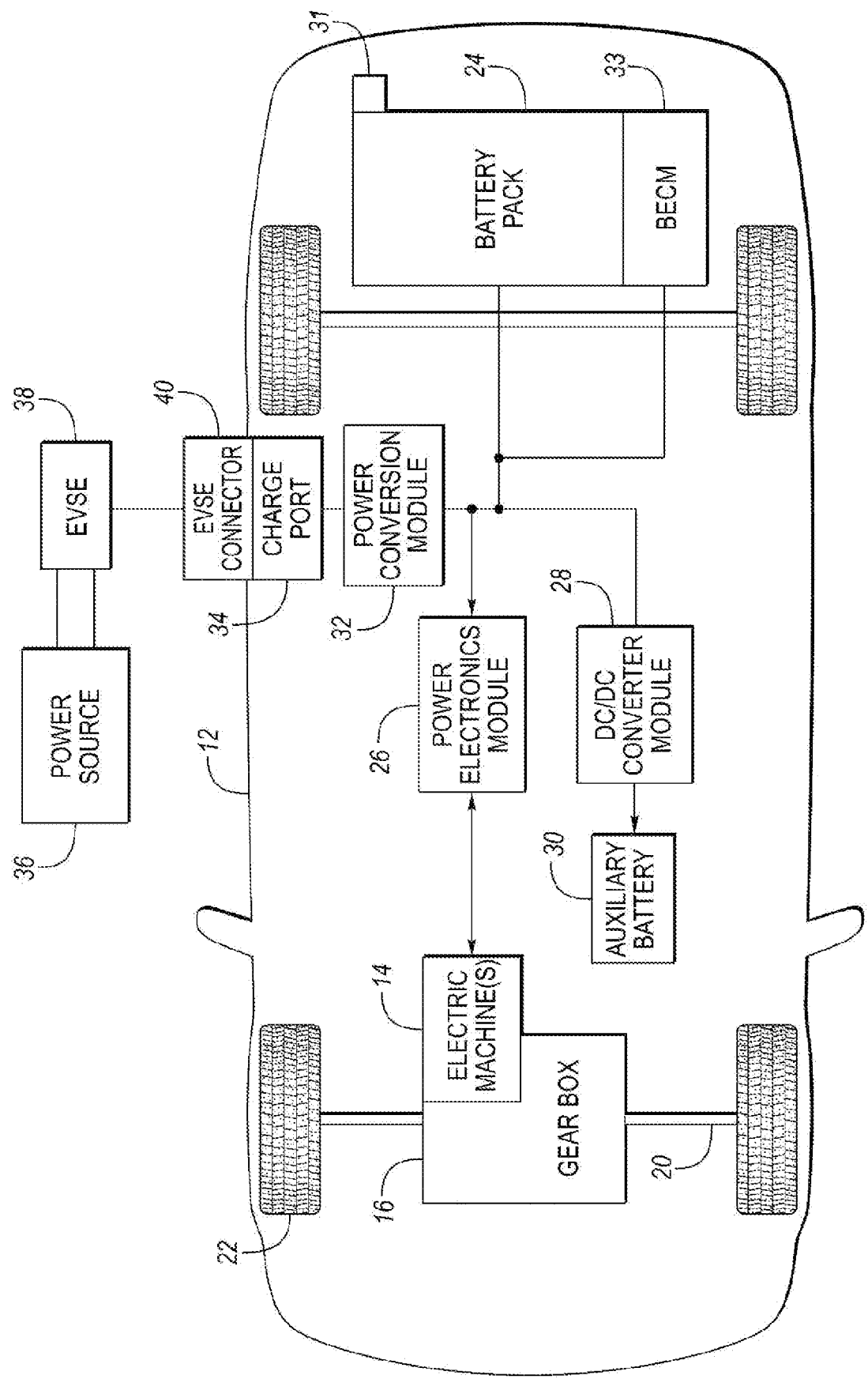
FIG. 1 is a schematic diagram of an example electric vehicle.

FIG. 1 depicts a schematic of an electric vehicle (BEV). Certain embodiments, however, may also be implemented within the context of plug-in hybrids. The vehicle 12 includes one or more electric machines (traction motors) 14 mechanically connected to a transmission or gearbox 16. The gearbox 16 may be a one-speed gearbox and may include a differential. The gearbox 16 is operably coupled to the driven wheels of the vehicle 22 by axle shafts 20.

A traction battery or battery pack 24 stores energy that can be used by the electric machines 14. The traction battery 24 typically provides a high-voltage direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. Different battery pack configurations may be available to address individual vehicle variables including packaging constraints and power requirements. The battery cells may be thermally regulated with a thermal-management system. Examples of thermal-management systems include liquid cooling systems.

The traction battery 24 may be electrically connected to one or more power electronics modules 26 through one or more contactors (not shown). The one or more contactors isolate the traction battery 24 from other components when opened and connect the traction battery 24 to other components when closed. The power-electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power-electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors, pumps, and electric heaters, may be connected directly to the high-voltage supply without the use of a DC/DC converter module 28. In a typical vehicle, the low-voltage systems are electrically connected to an auxiliary battery 30 (e.g., a 12-volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature sensor. The temperature sensor 31 may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC and/or AC electrical power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to one or more chargers or on-board power conversion module 32. The charge port 34 may include a connector for AC charging and another connector for DC charging. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding pins of the charge port 34. The charge port 34 and the vehicle 12 may be configured to connect with a so-called "fast charge" charging station. During fast charge, the vehicle may receive a high-voltage DC current.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, any reference to "a controller" refers to one or more controllers.

The traction battery 24 and other vehicle component are thermally regulated with one or more thermal-management systems. Example thermal-management systems are shown in the figures and described below.

Figure 2:
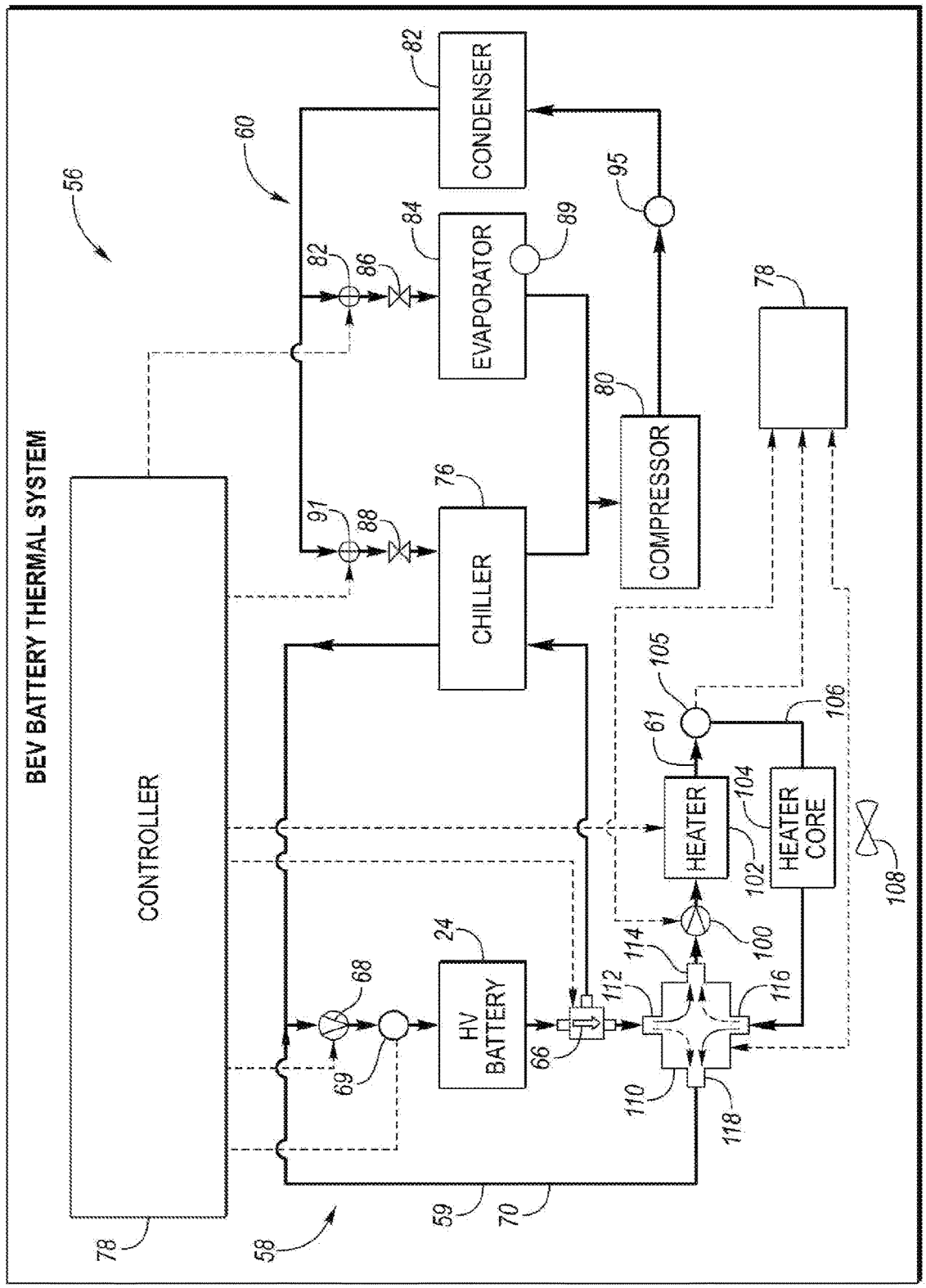
FIG. 2 is a schematic diagram of a thermal-management system of the vehicle.

Referring to FIG. 2, a vehicle 12 includes a thermal-management system 56. The thermal-management system 56 manages thermal loads generated by various vehicle components, such as the battery assembly 24, powertrain components, power-electronic components, and the passenger cabin. For example, the thermal-management system 56 can selectively circulate coolant to the battery 24 to either cool or heat the battery depending on operating conditions.

The thermal-management system 56 may include one or more vehicle controllers 78. While schematically shown as a two modules in the illustrated embodiment, the controller 78 may be part of a larger control system and may be controlled by various other controllers throughout the vehicle, such as a vehicle-system controller (VSC) that includes a powertrain control unit, a transmission control unit, an engine control unit, a battery energy control module (BECM), a hybrid powertrain control model (HPCM), etc. It should be understood that the controller 78 and one or more other controllers can collectively be referred to as "a controller" that controls, such as through a plurality of integrated algorithms, various actuators in response to signals from various sensors to control functions associated with the vehicle, and in this case, with the thermal-management system 56. The various controllers that make up the VSC can communicate with one another using a common bus protocol (e.g., CAN).

In one embodiment, the thermal-management system 56 includes a coolant subsystem 58 and a refrigerant (heat pump) subsystem 60. These two loops may operate in tandem or independently of each other depending upon the battery cooling/heating requirements, the ambient-air temperature, the passenger cooling/heating requirements, and other factors. The refrigerant subsystem 60 may be a vapor-compression heat pump that circulates a refrigerant transferring thermal energy to various components of the thermal-management system. The refrigerant subsystem 60 may include the air-conditioning (AC) system for the cabin and the cooling system for the battery 24. Utilizing the cabin AC may be more cost effective than having a dedicated refrigerant system for the traction battery 24. The coolant subsystem 58 includes a battery loop 59 and a cabin heating loop 61. The battery loop 59 circulates coolant through the battery assembly 24. The coolant may be a conventional coolant mixture, such as water mixed with ethylene glycol or other antifreeze. Other coolants could also be used by the coolant subsystem 58.

The battery loop 59 includes conduit, line, hosing, or tubing 70 that is configured to circulate the coolant through the battery 24 and a chiller 76. The coolant may be circulated by a pump 68. The battery loop 59 may also include temperature sensor 69 that is upstream of the battery 24 and configured to output data to the controller 78 indicative of a measured temperature of the coolant. A bypass valve 66 may be provided to bypass the chiller 76.

The chiller 76 exchanges heat with the refrigerant subsystem 60 to provide a chilled coolant during certain conditions. For example, when the battery temperature exceeds a predefined threshold and the cabin AC system 60 has capacity, the valve 66 may be actuated to circulate at least some coolant to the chiller 76. The warm coolant from the battery pack 24 may enter the chiller 76 and exchange heat with a refrigerant of the refrigerant subsystem 60 to dissipate heat. The battery chiller 76 may have any suitable configuration. For example, the chiller 76 may have a plate-fin, tube-fin, or tube-and-shell configuration that facilitates the transfer of thermal energy without mixing the heat-transfer fluids in the coolant subsystem 58 and the refrigerant subsystem 60.

The refrigerant subsystem 60, may include a compressor 80, a condenser 82, at least one cabin evaporator 84, the chiller 76, a first expansion device 86, a shutoff valve 87, a second expansion device 88, and a second shutoff valve 91. The compressor 80 pressurizes and circulates the refrigerant through the refrigerant subsystem 60. The compressor 80 may be powered by an electrical or non-electrical power source. A pressure sensor 95 may monitor the pressure of the refrigerant exiting the compressor 80.

The refrigerant exiting the compressor 80 may be circulated to the condenser 82 by one or more conduits. The condenser 82 transfers heat to the surrounding environment by condensing the refrigerant from a vapor to a liquid. A fan may be selectively actuated to circulate airflow across the condenser 82 to further effectuate heat transfer between the refrigerant and the airflow.

At least a portion of the liquid refrigerant that exits the condenser 82 may be circulated through the first expansion device 86 (depending upon the position of valve 87) and then to the evaporator 84. The first expansion device 86 is adapted to change the pressure of the refrigerant. In one embodiment, the first expansion device 86 is an electronically controlled expansion valve (EXV). In another embodiment, the first expansion device 86 is a thermal expansion valve (TXV) or a passive device. If the expansion device is an EXV, the shutoff valve can be omitted. The liquid refrigerant is vaporized from liquid to gas, while absorbing heat, within the evaporator 84. The gaseous refrigerant may then return to the compressor 80. The refrigerant subsystem may include an evaporator temperature sensor 89 that is electrically connected to the controller 78. The sensor 89 outputs a signal indicative of the evaporator temperature. The controller 78 may operate the system based on signals received from sensor 89. Alternatively, the valve 87 may be closed to bypass the evaporator 84.

Another portion of the liquid refrigerant exiting the condenser 82 (or all of the refrigerant if the valve 87 is closed) may circulate through the second expansion device 88 and enter the chiller 76 if the valve 91 is open. The second expansion device 88, which may also be an EXV or TXV or a passive device, is adapted to change the pressure of the refrigerant. The refrigerant exchanges heat with the coolant within the chiller 76 to provide the chilled coolant to the battery 24 during a chiller mode.

The cabin heating loop 61 may include a pump 100, a heater 102, a heater core 104, and conduit 106. The conduit is configured to circulate coolant through the various components of the heating loop 61. A temperature sensor 105 may be disposed on the conduit 106 downstream of the heater 102 and upstream of the heater core 104. The temperature sensor 105 is in electric communication with the controller 78 and is configured to output data indicative of a measured temperature of the coolant. The heater 102 may be an electric heater that is powered by the battery pack 24. In one or more embodiments, the heater 102 is a PTC heater. The heater core 104 may be disposed in a HVAC unit of the vehicle 12. Typically, the HVAC unit is disposed under a dashboard in the passenger cabin. The heater core 104 is a liquid-to-air heat exchanger that transfers thermal energy from the coolant into an airstream driven by a fan 108. The airstream produced by the fan 108 is directed into the passenger compartment to provide heat.

Thermal-management system 56 may include only one heater 102 that is shared between the passenger cabin and the traction battery 24. A valve 110 selectively connects the battery loop 59 and the cabin heating loop 61 in fluid communication. The valve 110 may be an electronically controlled valve, such as a four-way valve. The valve includes at least one position (first position) in which the battery loop 59 and the cabin heating loop 61 are connected in fluid communication and at least one position (second position) in which the fluid communication between the battery loop 59 and the cabin heating loop 61 is severed, i.e., the loops 59 and 61 are isolated from each other. In FIG. 2, the first position shown in solid and the second position as shown in dashed line type.

The valve 110 may include four ports or fittings 112, 114, 116, and 118. The ports 112 and 118 connect with the conduit of the battery loop 59. The ports 114 and 116 connect with the conduit of the cabin heating loop 61. The port 112 may be the inlet port for the battery loop 59 and the port 116 may be the inlet port for the cabin heating loop 61. The port 118 may be the outlet port for the battery loop 59 and the port 114 may be the outlet port for the cabin heating loop 61. In the first position, the ports 112 and 114 are connected in fluid communication and the ports 116 and 118 are connected in fluid communication. In the second position, the ports 112 and 118 are connected in fluid communication and the ports 114 and 116 are connected in fluid communication.

Since the heater 102 is shared between the battery 24 and the passenger cabin, it is possible for the summation of heat requested by the passenger cabin and the traction battery to exceed the heating capabilities of the heater 102. That is, there is insufficient thermal energy to provide the requested heating simultaneously. In these instances, the thermal-management system 56 must prioritize between the passenger cabin and the battery or provide some lesser amount of heating to both systems.

Figure 3:
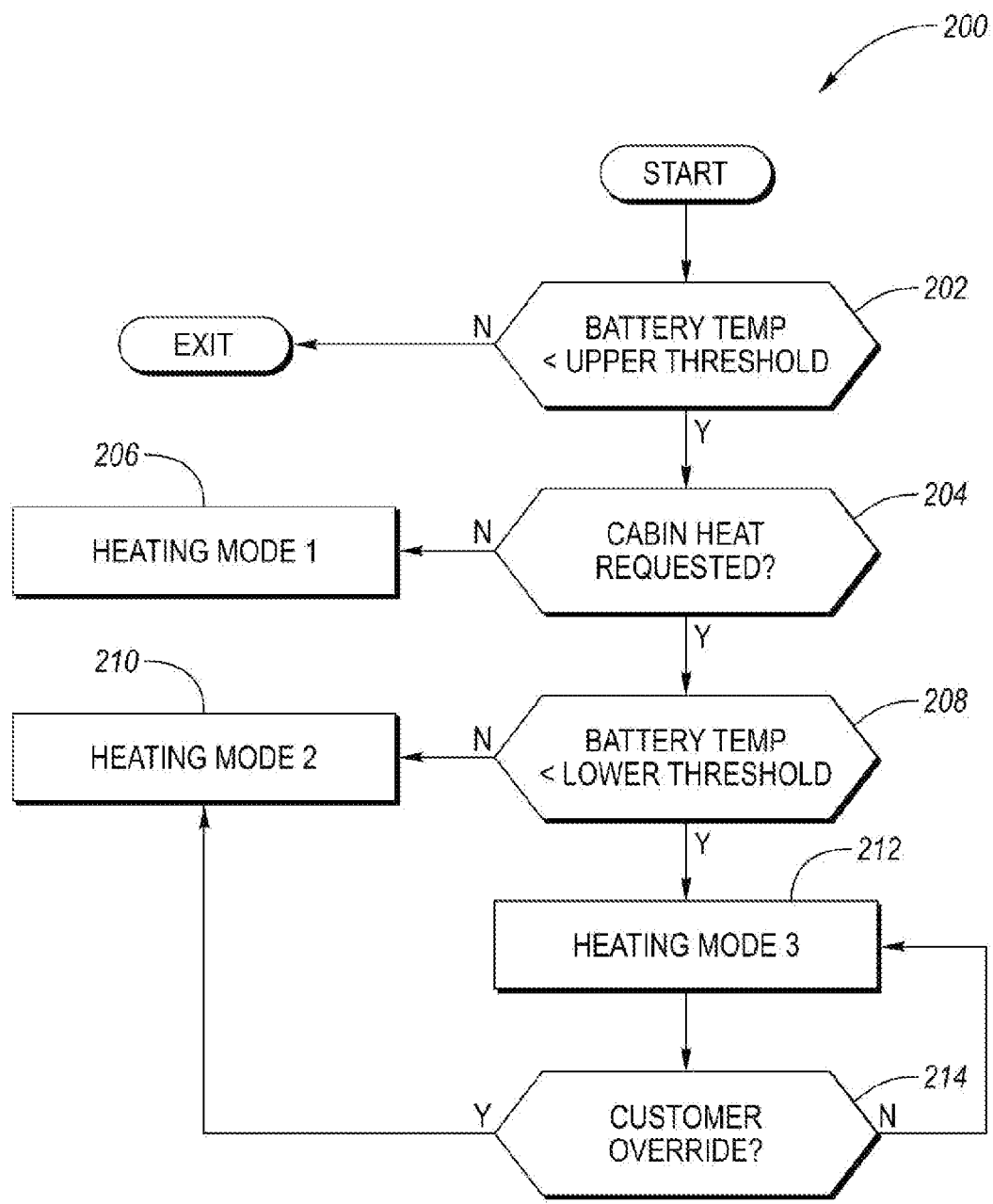
FIG. 3 is a flow chart of an algorithm for operating the thermal-management system during charging of the battery.

FIG. 3 illustrates a flowchart 200 of an algorithm for controlling the thermal-management system 56 during charging of the battery. The controls focus on splitting heat between the battery 24 and the passenger cabin during charging. Generally, the controls include a first heating mode (which is a battery only heating mode), a second heating mode (which may be a cabin only heating mode), and a third heating mode (which is a shared mode).

In heating mode 1, the valve 110 is actuated to the first position to connect the battery 24 in fluid communication with the heater 102. The heater 102 is energized to heat the coolant circulating therethrough. The fan 108 associated with the heater core 104 is deenergized so that all of the heat in the coolant circulates to the battery 24.

In heating mode 2, the valve 110 may be actuated to the second position to sever fluid communication between the battery loop and the cabin loop. In mode 2, the heater 102 is energized to heat the coolant and the fan 108 is energized to extract heat from the coolant via heater core 104 and provide a heated airstream into the passenger cabin. The speed or duty cycle of the fan 108 is set according to user request. For example, a user may request a fan speed and a temperature (cabin set point) for the heating system. Based on these requests, the controller may determine a target coolant temperature, a target air temperature, a blend door position, a fan speed, etc., to provide the desired heating.

In heating mode 3, the valve is actuated to the first position to connect the battery 24 and the heater core 104 in fluid communication with the heater 102 and the heater is energized. In mode 3, the thermal energy produced by the heater 102 is shared by both the battery 24 and the passenger cabin. Since the heater 102 may not have capacity to fully heat the battery 24 and the cabin as would otherwise be requested, a lesser amount of heat is provided to both. That is, a balance is struck between cabin comfort and battery heating. According to one embodiment, when in mode 3, the speed of the fan 108 may be set to a predetermined speed, such as LOW, or may be limited to a certain maximum fan speed, such as 40 percent. By doing so, the coolant temperature exiting the heater core 104 is sufficient to provide meaningful heat to the battery 24. The customer may override these limits which may result in the controls being switched to heating mode 2. In one or more embodiments, the controller may automatically activate additional settings designed to provide or facilitate heating of the cabin without increasing fan speed. For example, a blend door of the HVAC module may be switched to the recirculation position so that warm air is being recirculated to the cabin as opposed to colder ambient air. In another example, the controller may automatically activate the heated seats and/or heated steering wheel.

In an alternative embodiment, the battery may also be heated in heating mode 2. Here, heating of the cabin is prioritized, but the battery is heated if capacity remains for doing so. Unlike the above-described heating mode 2 in which the battery loop and the cabin heating loop are always severed, here, the position of the valve may be actively controlled to connect the battery loop and the cabin heating loop in fluid communication if capacity is available. For example, the controller may be programmed to, responsive to (i) battery heating being requested, (ii) the temperature of the battery being less than the lower threshold, and (iii) cabin heating being requested, periodically actuate the valve between the first and second position based on cabin coolant temperature (e.g., a target temperature), a cabin air temperature (e.g., a target temperature), and/or a battery coolant temperature (e.g., a target temperature). The coolant temperatures may be the temperature of the coolant exiting the heater such as the temperature measured by sensor 105 or entering the battery such as the temperature at sensor 69. The controller may compare the target coolant temperature to the measured temperature to determine an error and adjusts the duty cycle of the fan 108 and the position of the valve 110 based on this error. The controller may also set a target temperature for the cabin air and control the duty cycle of the fan 108 and position of valve 110 based on an error between the target cabin air temperature and the measured air temperature.

The controls 200 begin in response to the battery being charged. At operation 202, the controller determines if the battery temperature is less than an upper threshold. If the battery is hotter than the upper threshold, the controls 200 do not apply and are exited in lieu of other controls. The upper threshold may be set to a temperature at which the battery can accept full charging currents, e.g., 20° C.

At operation 204, the controller determines if cabin heating is being requested. If no, the thermal-management system is commanded to the first heating mode at operation 206. If yes, control passes to operation 208 where the controller determines if the battery temperature is less than a lower threshold. The lower threshold may be a temperature that permits sufficient charging current levels to generate meaningful self-heating within the battery, e.g., 10° C. If the battery temperature is greater than the lower threshold, control passes to operation 210 and the thermal-management system is commanded to heating mode 2 as the battery can self-heat. If the battery temperature is less than the lower threshold, control passes to operation 212 and the thermal-management system is commanded to heating mode 3. At operation 214, the controller determines if a customer override has been requested. For example, in heating mode 3, the heat is set to a lower setting to provide battery heating as well. If the customer, for example, increases the heat, such as by increasing the fan speed (or otherwise causing increased fan speed) beyond a limit, the controller switches to heating mode 2. At operation 214, the controller may also issue a message indicating the adverse effects on charging associated with the customer override. The message may include a prompt asking the driver whether they wish to proceed with the override or to withdraw the override request.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery;
   an electric machine powered by the traction battery and configured to power wheels a thermal-management system including:
   a battery loop configured to circulate coolant through the traction battery,
   a cabin heating loop configured to circulate coolant through a heater and a heater core,
   a blower configured to circulate air through the heater core to heat a passenger cabin of the vehicle, and
   a valve configured to fluidly connect the battery loop and the heating loop when the valve is in a first position and configured to fluidly isolate the battery loop and the heating loop when the valve is in a second position; and
   a controller programmed to, responsive to (i) battery heating being requested, (ii) a temperature of the battery being between upper and lower thresholds, and (iii) cabin heating being requested, actuate the valve to the second position and energize the blower and the heater to provide heating to the passenger cabin but not the battery.

2. The vehicle of claim 1, wherein the controller is further programmed to, responsive to (i) battery heating being requested, (ii) the temperature of the battery being greater than the lower threshold, and (iii) cabin heating being requested, actuate the valve to the first position and energize the blower and the heater to provide heating to the passenger cabin and the battery.

3. The vehicle of claim 2, wherein the controller is further programmed to, responsive to (i) battery heating being requested, (ii) the temperature of the battery being between the upper and lower thresholds, and (iii) cabin heating not being requested, actuate the valve to the second position, energize the heater, and de-energize the blower to provide heating to the battery but not the cabin.

4. The vehicle of claim 1, wherein the blower is energized to a speed based a temperature set point of the cabin.

5. The vehicle of claim 1, wherein the controller is further programmed to, responsive to (i) battery heating being requested, (ii) the temperature of the battery being greater than the lower threshold, and (iii) cabin heating being requested, actuate the valve to the first position, energize the heater and the blower, and limit a speed of the blower to a speed threshold.

6. The vehicle of claim 5, wherein the controller is further programmed to, responsive to a request to increase the speed above the speed threshold, actuate the valve to the second position.

7. The vehicle of claim 1, wherein the controller is further programmed to, responsive to (i) battery heating being requested, (ii) the temperature of the battery being greater than the lower threshold, and (iii) cabin heating being requested, actuate the valve to the first position, energize the blower and the heater to provide heating to the cabin and the battery, and activate a heated seat.

8. The vehicle of claim 1, wherein the controller is further programmed to, responsive to (i) battery heating being requested, (ii) the temperature of the battery being less than the lower threshold, and (iii) cabin heating being requested, periodically actuate the valve between the first and second positions based on a target coolant temperature.

9. The vehicle of claim 8, wherein the valve is actuated to the second position responsive to a temperature of the coolant being less than the target coolant temperature.

10. A vehicle comprising:
a traction battery;
an electric machine powered by the traction battery and configured to power wheels of the vehicle;
a thermal-management system including:
  a battery loop configured to circulate coolant through the traction battery,
  a cabin heating loop configured to circulate coolant through a heater and a heater core,
  a blower configured to circulate air through the heater core to heat a passenger cabin of the vehicle, and
  a valve configured to fluidly connect the battery loop and the heating loop when the valve is in a first position and configured to fluidly isolate the battery loop and the heating loop when the valve is in a second position; and
a controller programmed to:
responsive to (i) battery heating being requested, (ii) a temperature of the battery being between upper and lower thresholds, and (iii) cabin heating being requested, actuate the valve to the second position and energize the blower and the heater to provide heating to the passenger cabin but not the battery,
responsive to (i) battery heating being requested, (ii) the temperature of the battery being greater than the lower threshold, and (iii) cabin heating being requested, actuate the valve to the first position, energize the blower and the heater to provide heating to the cabin and the battery, and actuate a blend door to a recirculation position.

11. A vehicle comprising:
a traction battery;
an electric machine powered by the traction battery and configured to power wheels of the vehicle;
a thermal-management system including a battery loop, a cabin heating loop, and a valve configured to fluidly connect the battery loop and the cabin heating loop when in a first position and configured to fluidly isolate the battery loop and the cabin heating loop when in a second position; and
a controller programmed to:
responsive to (i) battery heating being requested, (ii) a temperature of the battery being greater than a lower threshold, and (iii) cabin heating being requested, actuate the valve to the first position to heat a cabin and the battery,
limit a speed of the blower to a speed threshold, and
responsive to a request to increase the speed above the speed threshold, actuate the valve to the second position.

12. The vehicle of claim 11, wherein the cabin loop includes a heater and a heater core, and further comprising a blower associated with the heater core, wherein the controller is further programmed to energize the blower and the heater in response to (i) battery heating being requested, (ii) the temperature of the battery being greater than the lower threshold, and (iii) cabin heating being requested.

13. The vehicle of claim 12, wherein the controller is further programmed to limit a speed of the blower to a speed threshold.

14. The vehicle of claim 11, wherein the controller is further programmed to, responsive to (i) battery heating being requested, (ii) the temperature of the battery greater than the lower threshold, and (iii) cabin heating being requested, actuate the valve to the second position to heat the cabin but not the battery.

15. The vehicle of claim 11, wherein the controller is further programmed to activate a heated seat in response to (i) battery heating being requested, (ii) the temperature of the battery being greater than a lower threshold, and (iii) cabin heating being requested.

16. The vehicle of claim 11, wherein the controller is further programmed to periodically actuate the valve between the first and second position based on a target coolant temperature.

* * * * *